UNITED STATES PATENT OFFICE 2,472,628

PROCESS FOR PREPARING C-ACETYLATED AND O-ACETYLATED COMPOUNDS

John A. Spence, San Pablo, Calif., and Edward F. Degering, West Lafayette, Ind., assignors to Purdue Research Foundation, La Fayette, Ind., a corporation of Indiana No Drawing. Application December 5, 1946, Serial No. 714,144

13 Claims. (Cl. 260—473)

This invention relates to a process for preparing C-acetylated and O-acetylated compounds.

In our copending application Serial No. 556,887, filed October 2, 1944 (now United States Patent 2,407,302, dated September 10, 1946), we have shown that β-ketocarboxylic esters and ketenes react, in the presence of certain acid catalysts, e. g. sulfuric acid, chlorosulfonic acid, sulfamic acid, etc., to give enol esters. On the other hand, we have found, as shown in our copending application Serial No. 613,698, filed August 30, 1945 (now United States Patent 2,417,381, dated March 11, 1947), that ketene and β-ketocarboxylic esters react to give C-acetylated compounds when no catalyst is present.

We have now found that β-ketocarboxylic esters and ketene react, in the presence of tertiary amines, to give both C-acetylated and O-acetylated compounds.

It is, accordingly, an object of our invention to provide a new process for preparing C-acetylated and O-acetylated compounds. Further objects will become apparent hereinafter.

In accordance with our invention, we react ketene with a β-ketocarboxylic ester selected from those represented by the following general formula:

I.

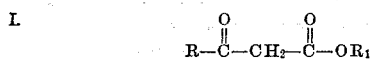

wherein R and R₁ each represents a hydrocarbon radical, e. g. a member selected from the group consisting of alkyl groups, aralkyl groups and aryl groups, in the presence of a tertiary amine catalyst.

Usually in our new process, two simultaneous reactions take place with the formation of C-acetylated compounds which can be represented by the following general formula:

II.

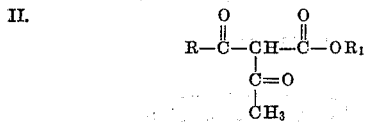

wherein R and R₁ have the values given above, and O-acetylated compounds which can be represented by the following general formula:

III.

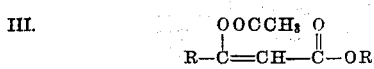

wherein R and R₁ have the values given above. The C-acetylated and O-acetylated compounds can be separated as shown hereinafter. Depending upon the starting β-ketocarboxylic ester and upon the particular tertiary amine employed as catalyst, we have found that the proportion of C-acetylated to O-acetylated compound varies. Moreover, in our process, we frequently obtain substantial amounts of enol acetate which can be represented by the following general formula:

IV.

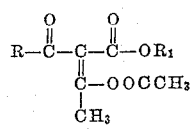

wherein R and R₁ have the values given above. These latter enol acetates are formed apparently by the action of ketene upon the C-acetylated compounds represented by Formula II above.

Typical examples of the starting β-ketocarboxylic esters (Formula I above) include methyl acetoacetate, ethyl acetoacetate, benzyl acetoacetate, phenyl acetoacetate, ethyl propionoacetate, methyl n-butyroacetate, ethyl benzoylacetate, ethyl decanoylacetate, etc.

Typical examples of the tertiary amine-catalysts include triethylamine, tri-n-butylamine, tri-amylamines, diethyl-n-butylamine, tribenzylamine, dimethylaniline, diethylaniline, pyridine, N-methylpiperidine, dimethyl-n-propylamine, trimethylamine, triisobutylamine, triisopropylamine, etc.

In practicing our invention, the β-ketocarboxylic ester and tertiary amine catalyst are placed in a reaction vessel. The contents of the reaction vessel are then raised to reaction temperature and ketene (CH₂=C=O), preferably freshly prepared, is added to the contents of the reaction vessel at a rate which substantially precludes the building up in the reaction mixture of any substantial quantity of unreacted ketene. The dispersion of the ketene in the reaction mixture is advantageously facilitated by agitation of the reaction mixture. Agitation also aids in avoiding local overheating of the reaction mixture. The addition of ketene is advantageously continued until a quantity has been added which is at least as much as the molecular equivalent of the quantity of the β-ketocarboxylic ester, or until no further reaction takes place.

The ketene employed in practicing our invention can be prepared in any suitable manner. A convenient method for preparing ketene is by pyrolysis of acetone, advantageously removing the small amount of residual acetone by passing the resulting vapors through a series of cold traps before utilizing the ketene for the process of our invention.

The process of our invention takes place over a wide temperature range. Usually we have found that the reaction takes place at an appreciable rate at from about 60° C. to about 130° C., although higher or lower temperatures can be employed. Especially with the higher molecular weight β-ketocarboxylic esters, higher temperatures should be avoided in order to avoid thermal decomposition of the compounds. The heat of reaction may require cooling of the reaction mixture to control the temperature within the desired range.

If desired a reaction medium which is inert to the ketene and the β-ketocarboxylic ester, e. g. a saturated aliphatic hydrocarbon or an aromatic hydrocarbon can be employed. However, a reaction medium is unnecessary in the case of most β-ketocarboxylic esters which are liquid at the reaction temperature employed.

As pointed out above C-acetylated and O-acetylated compounds are produced simultaneously in our new process. The mixture of C-acetylated and O-acetylated compounds is advantageously distilled from the reaction mixture and the O-acetylated compound separated from the mixture by treating the mixture with an aqueous solution of an alkali metal carbonate, e. g. sodium carbonate. The C-acetylated compound dissolves in the aqueous alkali metal carbonate solution, leaving the water-insoluble O-acetylated compound. The C-acetylated compound and O-acetylated compound can also be separated by treating the mixture with an aqueous solution of a water-soluble copper salt, e. g. cupric acetate. The copper salt of the C-acetylated compound precipitates, leaving the water-insoluble O-acetylated compound. The copper salt of the C-acetylated compound can then be hydrolyzed, in the presence of an acid, e. g. sulfuric acid, to regenerate the C-acetylated compound.

The following examples will serve to illustrate further the manner of practicing our invention:

EXAMPLE 1.—KETENE AND ETHYL ACETOACETATE, PRESENCE OF A TERTIARY AMINE 65 g. (0.5 mole) of ethyl acetoacetate and 0.007 mole of tertiary amine were placed in a reaction vessel. From 1.2 to 1.4 moles of ketene ($CH_2=C=O$), generated by the pyrolysis of acetone, was passed into the mixture of ethyl acetoacetate and tertiary amine over a period of two hours, while maintaining a reaction temperature of 105±5° C. and vigorously agitating the mixture. The reaction mixture was then distilled under reduced pressure and the reaction product boiling at 85–100° C. at 10 mm. of Hg pressure was rectified using a small Podbielniak column. The fraction boiling at 87–89° C. at 10 mm. of Hg pressure was a mixture of the enol acetate having the formula:

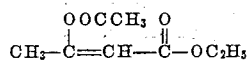

and ethyl diacetylacetate having the formula:

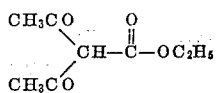

When tributylamine, diethylaniline or pyridine was used as the tertiary amine catalyst, the enol acetate of ethyl diacetylacetate was also isolated from the reaction mixture as an oil boiling at 130–133° C. at 10 mm. of Hg pressure.

The following table shows the results obtained with representative tertiary amines:

Table I

| Tertiary amine | 87–90° C./10 mm. mixture | $n_D^{29}$ of mixture | Enol acetate of ethyl diacetyl acetate |
| --- | --- | --- | --- |
| tri-n-butylamine | 21 ml. | 1.4485–28 | 17 ml. |
| Do | 19 g. | 1.4446 | 26 ml. |
| Do | 34 ml.[1] | 1.4429–05 | 40 ml. |
| diethylaniline | 43 g. | 1.4651 | 8 ml. |
| Do | 31 g. | 1.4645 | |
| pyridine | 31 g. | 1.4579–50 | 7 ml. |
| Do | 21 g. | 1.4460–80 | 33 g. |
| tribenzylamine | 48 g. | 1.4635 | none. |
| Do | 42 g. | 1.4662 | 10 ml. |

[1] Reaction temperature of 60–80° C. used.

EXAMPLE 2.—SEPARATION OF MIXTURE OF ENOL ACETATE OF ETHYL ACETOACETATE AND ETHYL DIACETYLACETATE-SODIUM CARBONATE SOLUTION METHOD 21 g. of the mixture, obtained when tri-n-butylamine was employed as catalyst and having an index of refraction ($n_D^{29}$) between 1.4485 and 1.4428, was shaken with two 10 ml. portions of aqueous sodium carbonate solution (10 per cent by weight). The water-insoluble oil was then dried over anhydrous calcium chloride. The dried oil had an index of refraction ($n_D^{27}$) of 1.4406 which agrees with that of the enol acetate of ethyl acetoacetate, 18.5 g. of the enol acetate of ethyl acetoacetate was thus obtained. In this case, pure ethyl diacetylacetate was not isolated, but its presence was established when its copper salt (melting at 152° C.) was isolated. This sodium carbonate solution method of separation of isomers is satisfactory for isolation of the enol acetate of ethyl acetoacetate when the enol acetate is the predominant part of the mixture.

EXAMPLE 3.—SEPARATION OF MIXTURE OF ENOL ACETATE OF ETHYL ACETOACETATE AND ETHYL DIACETYL ACETATE-COPPER SALT METHOD 48 g. of the mixture (87–90° C./10 mm.; $n_D^{29}$ 1.4635) obtained when tribenzylamine was employed as a catalyst and 400 ml. of a saturated aqueous copper acetate solution were shaken together intermittently over a period of one hour. The blue precipitate which formed was removed by filtration and washed with four 40 ml. portions of water. The air-dried blue salt was then washed with two 50 ml. portions of cold diethyl ether. The blue salt (55.2 g.) was recrystallized from 60 ml. of absolute ethanol. 48 g. (M. P. 148–150° C.) was obtained. This quantity of salt is equivalent to 40.8 g. of ethyl diacetyl acetate. The blue salt can be hydrolyzed with dilute sulfuric acid to yield ethyl diacetyl acetate.

The following table summarizes the separation of the mixture given in the above Table I.

Table II

| $n_D^{29}$ of mixture | gms. Cu salt of ethyl diacetyl acetate | cal'd grams ethyl diacetyl acetate |
| --- | --- | --- |
| 1.4485–28 | present | |
| 1.4446 | 3.5 | 3.0 |
| 1.4429–05 | present | |
| 1.4651 | 46.0 | 39.1 |
| 1.4645 | 33.0 | 28.0 |
| 1.4579–50 | [1] 28.0 | 23.8 |
| 1.4460–80 | 5.8 | 4.9 |
| 1.4635 | 48.0 | 40.8 |
| 1.4662 | 54.0 | 45.9 |

[1] Obtained from 26 g. of the mixture (87–90° C./10 mm.).

The enol acetate of ethyl diacetylacetate (130–133° C./10 mm.) does not form a copper salt. Its 2,4-dinitrophenylhydrazine derivative melts at 157 to 159° C. This same enol acetate was prepared by reaction of ketene with ethyl diacetylacetate in the presence of sulfuric acid, as shown in the following example.

EXAMPLE 4.—ENOL ACETATE OF ETHYL DIACETYLACETATE 0.3 mole (51.6 g.) of ethyl diacetylacetate and 0.004 mole of concentrated sulfuric acid were placed in a reaction vessel. Approximately one mole of ketene ($CH_2=C=O$) was passed into the ethyl diacetylacetate during a period of 1.4 hours, while maintaining a reaction temperature of 105±5° C. and vigorously agitating the contents of the reaction vessel. The resulting reaction mixture was then allowed to stand for 15 hours at a temperature between 25 and 35° C. and then the mixture was distilled under reduced pressure. 46 g. (72 per cent yield) of the enol acetate, boiling at 116–118° C. at 5 mm. of Hg pressure, was obtained.

EXAMPLE 5.—KETENE AND ETHYL BENZOYLACETATE, PRESENCE OF TRI-N-BUTYLAMINE 20 g. (0.104 mole) of ethyl benzoylacetate and 0.3 g. (0.0016 mole) of tri-n-butylamine were placed in a reaction vessel. 5.5 g. (0.13 mole) of ketene ($CH_2=C=O$), generated by the pyrolysis of acetone, were passed into the mixture of ethyl benzoylacetate and tri-n-butylamine, over a period of about one hour, while keeping the temperature of the mixture between 67 and 75° C. The reaction mixture, after the addition of ketene, was reddish-brown, but had very little color. It was dissolved in 25 ml. of diethyl ether and the ether solution treated to separate the C-acetylated and O-acetylated derivatives, according to the method of Bernhard, Ann. 282, 153 (1894) as follows: the ether solution was shaken with two 20-ml. portions of aqueous potassium carbonate solution (10 per cent by weight) to extract the C-acetylated compound, i. e. ethyl benzoylacetylacetate. Then, the ether solution was shaken with two 20-ml. portions of aqueous potassium hydroxide (10 per cent by weight) to extract the unreacted ethyl benzoyl acetate. The residual ether solution contained the O-acetylated compounds. The potassium carbonate solution and the potassium hydroxide solution were then each acidified with sulfuric acid and the oil which separated in each case was taken up in separate portions of diethyl ether. These two ether extracts and the ether solution remaining from the alkaline extractions were each dried over anhydrous sodium sulfate. The ether was removed from each of the three dried extracts by heating on a steam bath, passing dehydrite dried air into each extract to speed up the removal of the ether. From the ether extracts the following were obtained:

|  | | $n_D^{28}$ |
|---|---|---|
| I. (Potassium carbonate soluble), | 1.0 g. | 1.5390 |
| II. (Potassium hydroxide soluble), | 8.8 g. | 1.5310 |
| III. (Alkali insoluble), | 9.0 g. | 1.5202 |

Product I reacted with aqueous cupric acetate to give a precipitate of a sky blue salt, which after recrystallization from benzene melted at 223 to 225° C. (Copper salt of ethyl benzoylacetylacetate melts at 224° C. See Beilstein, 4th ed. 10, 817.) Product I represents a 4 per cent yield of ethyl acetylbenzoylacetate (acetylbenzoylcarbethoxymethane). Product II was a mixture of ethyl benzoylacetylacetate and unreacted ethyl benzoylacetate. Product III was the enol acetate of ethyl acetylbenzoylacetate. It reacted exothermically with phenylhydrazine to give acetylphenylhydrazine ($C_6H_5NH-NHCOCH_3$) and 4-carbethoxy-3-methyl-1,5-diphenylpyrazole, melting at 128.5 to 129° C. and 119 to 120° C., respectively.

In the manner illustrated in the foregoing examples methyl acetoacetate, benzyl acetoacetate, phenyl acetoacetate, ethyl propionoacetate, ethyl decanoylacetate, etc., can be acetylated with ketene, in the presence of a tertiary amine.

What we claim as our invention and desire to be secured by Letters Patent of the United States is:

1. A process for preparing an O-acetylated compound and a C-acetylated compound comprising reacting ketene with a ketoester selected from those represented by the following general formula:

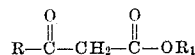

wherein R and $R_1$ each represents a hydrocarbon radical, in the presence of at least one basic tertiary amine catalyst, and separating the O-acetylated and C-acetylated compounds.

2. A process for preparing a mixture of an O-acetylated and C-acetylated compound comprising reacting ketene with ethyl acetoacetate, in the presence of at least one basic tertiary amine catalyst.

3. A process for preparing an O-acetylated compound and a C-acetylated compound comprising reacting ketene with ethyl acetoacetate, in the presence of at least one basic tertiary amine catalyst, and separating the O-acetylated and C-acetylated compound.

4. A process for preparing a mixture of O-acetylated and C-acetylated compounds comprising reacting ketene with ethyl acetoacetate in the presence of at least one trialkylamine wherein each alkyl group is of the formula $C_nH_{2n+1}$ wherein $n$ represents a positive integer of from 1 to 5.

5. A process for preparing a mixture of O-acetylated and C-acetylated compounds comprising reacting ketene with ethyl acetoacetate, in the presence of at least one trialkylamine wherein each alkyl group is of the formula $C_nH_{2n+1}$ wherein $n$ represents a positive integer of from 1 to 5, and separating the O-acetylated and C-acetylated compounds.

6. A process for preparing a mixture of O-acetylated and C-acetylated compounds comprising reacting ketene with ethyl acetoacetate, in the presence of tri-n-butylamine.

7. A process for preparing a mixture of O-acetylated and C-acetylated compounds comprising reacting ketene with ethyl acetoacetate, in the presence of tri-n-butylamine, and separating the C-acetylated and O-acetylated compounds.

8. A process for preparing a mixture of O-acetylated and C-acetylated compounds comprising reacting ketene with ethyl benzoylacetate, in the presence of at least one basic tertiary amine.

9. A process for preparing a mixture of O-acetylated and C-acetylated compounds comprising reacting ketene with ethyl benzoylacetate, in the presence of at least one basic tertiary amine, and separating the O-acetylated and C-acetylated compounds.

10. A process for preparing a mixture of

O-acetylated and C-acetylated compounds comprising reacting ketene with ethyl benzoylacetate, in the presence of at least one trialkylamine wherein each alkyl group is of the formula $C_nH_{2n+1}$ wherein $n$ represents a positive integer of from 1 to 5.

11. A process for preparing a mixture of O-acetylated and C-acetylated compounds comprising reacting ketene with ethyl benzoylacetate, in the presence of at least one trialkylamine wherein each alkyl group is of the formula $C_nH_{2n+1}$ wherein $n$ represents a positive integer of from 1 to 5, and separating the O-acetylated and C-acetylated compounds.

12. A process for preparing a mixture of O-acetylated and C-acetylated compounds comprising reacting ketene with ethyl benzoylacetate, in the presence of tri-n-butylamine.

13. A process for preparing a mixture of O-acetylated and C-acetylated compounds comprising reacting ketene with ethyl benzoylacetate, in the presence of tri-n-butylamine, and separating the C-acetylated and O-acetylated compounds.

JOHN A. SPENCE.
EDWARD F. DEGERING.

REFERENCES CITED

The following references are of record in the file of this patent:

UNITED STATES PATENTS

| Number | Name | Date |
|---|---|---|
| 2,351,366 | Pohl et al. | June 13, 1944 |
| 2,407,301 | Spence et al. | Sept. 10, 1946 |
| 2,407,302 | Spence et al. | Sept. 10, 1946 |
| 2,417,381 | Spence | Mar. 11, 1947 |